(12) United States Patent
Panchal et al.

(10) Patent No.: US 11,723,062 B2
(45) Date of Patent: Aug. 8, 2023

(54) SYSTEM AND METHOD FOR DETERMINING PRIORITIES FOR HANDLING DATA BASED ON NETWORK SLICE IDENTIFIERS

(71) Applicant: Verizon Patent and Licensing Inc., Basking Ridge, NJ (US)

(72) Inventors: Jignesh S. Panchal, Hillsborough, NJ (US); Kristen Sydney Young, Mine Hill, NJ (US); Sudhakar Reddy Patil, Flower Mound, TX (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 17/193,672

(22) Filed: Mar. 5, 2021

(65) Prior Publication Data
US 2022/0287051 A1 Sep. 8, 2022

(51) Int. Cl.
*H04W 72/12* (2023.01)
*H04W 72/566* (2023.01)
*H04L 49/90* (2022.01)
*H04W 72/23* (2023.01)

(52) U.S. Cl.
CPC ........... *H04W 72/569* (2023.01); *H04L 49/90* (2013.01); *H04W 72/23* (2023.01)

(58) Field of Classification Search
None
See application file for complete search history.

(56) References Cited

U.S. PATENT DOCUMENTS

2019/0313359 A1* 10/2019 Lee .......................... H04W 4/40

* cited by examiner

*Primary Examiner* — Kouroush Mohebbi

(57) ABSTRACT

Systems and methods relate to: receiving a request for session, from a first device over a wireless link, for a service, wherein the request includes a Single-Network Slice Selection Assistance Information (S-NSSAI) that is associated with the service; determine a priority for the session based on the S-NSSAI; and performing, based on the determined priority, an uplink procedure or a downlink procedure for the session. A network include the network component that receives the request for session.

20 Claims, 12 Drawing Sheets

FIG. 8A
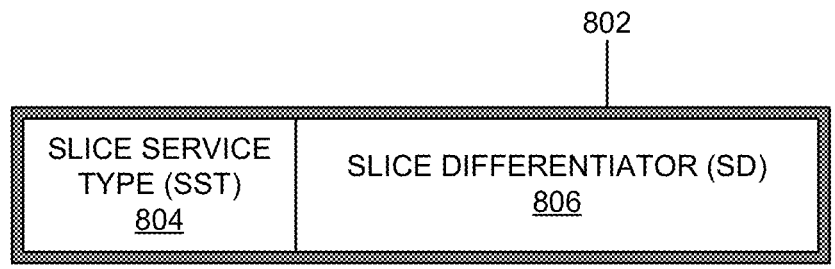
FIG. 8B
| SST | 3GPP VALUE |
|---|---|
| eMBB | 1 |
| URLLC | 2 |
| MIoT | 3 |
| V2X | 4 |
FIG. 8C
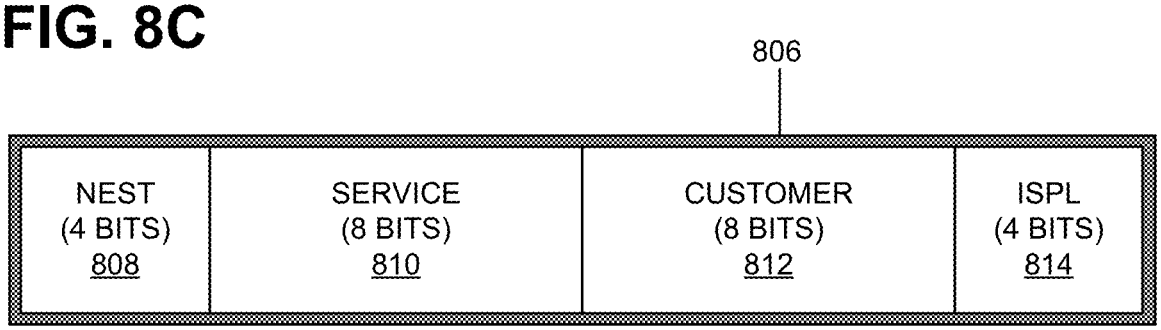

FIG. 9

| USE CASE | SST | SLICE DIFFERENTIATOR (SD) | | | | S-NSSAI | ASSOCIATED DNN |
|---|---|---|---|---|---|---|---|
| | | NEST | SERVICE | CUSTOMER | ISPL | | |
| eMBB - MOBILE | 0x01 | 0x0 | 0x00 | 0x00 | 0x7 | 0x01000007 | PSINTERNET B2BINTERNET IMS ADMIN |
| eMBB - FILXED | 0x01 | 0x0 | 0x00 | 0x00 | 0x6 | 0x01000006 | PSINTERNET B2BINTERNET IMS ADMIN |

FIG. 10

| USE CASE | NEST | SERVICE | CUST | ISPL | S-NSSAI SST | S-NSSAI SD | DNN | 5QI |
|---|---|---|---|---|---|---|---|---|
| Emergency | eMBB (1) | Emergency (1) | 0 | 1 | 1 | 1.1.0.1 | Emergency | 1 |
| Voice | eMBB (1) | Voice (2) | 0 | 1 | 1 | 1.2.0.1 | IMS | 1 |
| Internet | eMBB (1) | Internet (3) | 0 | 7 | 1 | 1.3.0.7 | Internet | |
| Video | | | | | | | | 8 |
| Audio | | | | | | | | 7 |
| AR/VR | | | | | | | | 6 |
| Browsing | | | | | | | | 7 |
| PS Internet | eMBB (1) | PS (4) | 0 | 0 | 1 | 1.4.0.0 | PS Internet | 1 |
| B2B Internet | eMBB (1) | B2B (5) | 0 | 5 | 1 | 1.5.0.5 | B2B Internet | 8 |
| Admin | eMBB (1) | Admin (6) | 0 | 6 | 1 | 1.6.0.6 | Admin | 8 |
| URLLC | | | | | | | | 8 |
| V2V | URLLC (1) | V2V (1) | 0 | 2 | 2 | 1.1.0.2 | V2V | 2 |
| AR/VR | URLLC (1) | AR/VR (2) | 0 | 3 | 2 | 1.2.0.3 | AR | 2 |
| PS | URLLC (1) | PS URLLC (1) | 0 | 0 | 2 | 1.3.0.0 | PSURLLC | 2 |
| MIoT | | | | | | | | |
| Cat-M1 | MIoT (1) | Cat-M1 (1) | 0 | 7 | 3 | 1.1.0.7 | Cat | 7 |
| Telematics | MIoT (1) | Telematics (2) | 0 | 7 | 3 | 1.2.0.7 | Telematics | 7 |
| PS | MIoT (1) | PS MIoT (5) | 0 | 0 | 3 | 1.5.0.0 | PSMIOT | 7 |

SYSTEM AND METHOD FOR DETERMINING PRIORITIES FOR HANDLING DATA BASED ON NETWORK SLICE IDENTIFIERS

BACKGROUND INFORMATION

Advanced wireless networks, such as Fifth Generation (5G) networks may rely on network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with mobile communication devices and/or fixed wireless access (FWA) devices.

BRIEF DESCRIPTION OF THE DRAWINGS

FIG. 8A illustrates an exemplary format of an S-NSSAI;

FIG. 8B illustrates examples of a Slice Service Type (SST) according to one implementation;

FIG. 8C depicts exemplary fields of a Slice Differentiator (SD) according to one implementation;

FIG. 9 illustrates examples of SST, SD, and S-NSSAI according to an implementation;

FIG. 10 illustrates an exemplary mapping between S-NSSAIs and network services;

DETAILED DESCRIPTION OF PREFERRED EMBODIMENTS

The following detailed description refers to the accompanying drawings. The same reference numbers in different drawings may identify the same or similar elements.

The systems and methods described herein relate to prioritizing data for transmission and/or processing based on network slice identifiers. According to implementations described herein, a network implements a service or an application on a network slice that may be identified by a Single-Network Slice Selection Assistance Information (S-NSSAI). When a user equipment (UE) device attaches to the network to receive the service on the network slice, the UE provides the S-NSSAI to the wireless station. When the wireless station or a component within the wireless station, through which the UE establishes its link with the network, receives the S-NSSAI, the wireless station and/or the component uses the S-NSSAI to assign a priority to data to be transmitted to the UE or processed. Using the assigned priority, the wireless station and/or the component may schedule the data to be transmitted to the UE, determine whether to use certain network resources for transmission to the UE, and/or perform admission control and preemption with respect to the UE.

Figure 1:
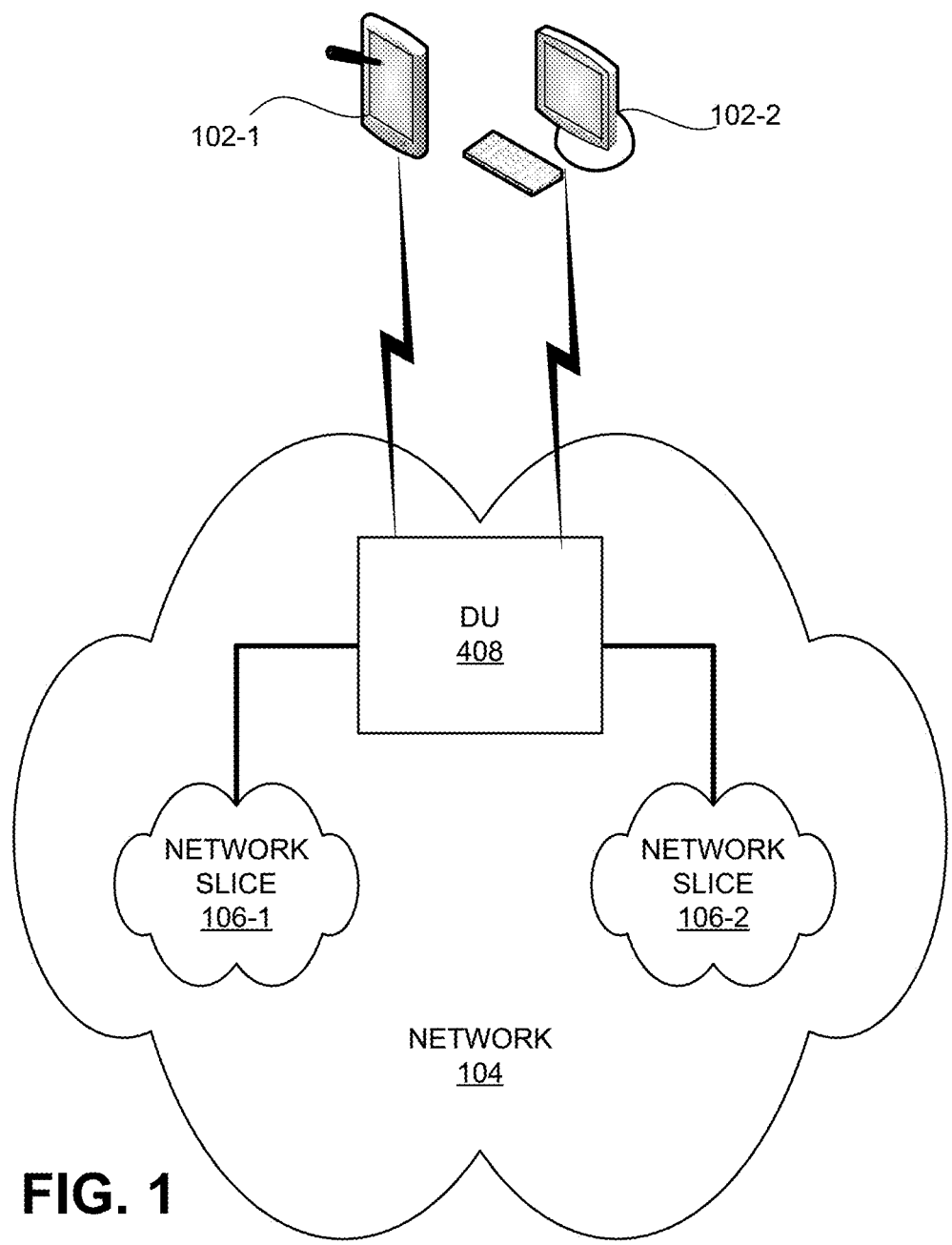
FIG. 1 illustrates concepts described herein.

FIG. 1 illustrates the concepts described herein. As shown, UEs 102-1 and 102-2 (UEs 102) have established wireless links to a network 104, through what is known as a Distributed Unit (DU) 408. DU 408 may be part of a wireless station (not shown) through which UEs 102 establish connections to network 104. Although DU 408 may be separate from radio units (RUs) in many implementations, in FIG. 1, for simplicity, it is assumed that DU 408 includes RUs or is coupled to RUs.

Network 104 offers various communications-related services (e.g., an Internet service, a Short Messaging Service (SMS), a Voice-over-IP (VoIP) service, video streaming service, etc.). In particular, network 104 offers an emergency call handling service and an Internet service. Network 104 may implement these services on a network slice 106-1 and/or a network slice 106-2.

Assume that UE 102-1 (e.g., a mobile device) establishes an emergency call through network slice 106-1 and that UE 102-2 (e.g., a fixed wireless access device (FWA)) establishes a browsing session through network slice 106-2. Data to/from network slice 106-1 and network slice 106-2 may then be transmitted to or received from UEs 102-1 and 102-2 through DU 408. At DU 408, data to/from network slice 106-1 is associated with an S-NSSAI that identifies network slice 106-1 and data to/from network slice 106-2 is tagged with an S-NSSAI that identifies network slice 106-2.

At DU 408, data from network slice 106-1 and network slice 106-2 may have different levels of importance, since network slice 106-1 renders emergency call handling service and network slice 106-2 provide an Internet service. If there is data from both network slices 106-1 and 106-2 at the same time at DU 408 for transmission, the data from network slice 106-1 should take precedence over the data from network slice 106-2. Similarly, data from UE 102-1 should have precedence over data from UE 102-2, for processing. That is, it is desirable for DU 408 to establish data priorities, depending on the services associated with the data.

The systems and methods described herein establish data priorities, such as those described above as being desirable, based on the network slice on which the service is implemented. In the embodiments described herein, because different services are implemented on different network slices, DU 408 may be configured to use network slice identifiers (i.e., S-NSSAIs) that accompany data to distinguish data for different services and to prioritize data for processing. In particular, the systems and methods may use the priorities for: scheduling the data for transmission; determining when to allocate particular physical resources, herein referred to as physical resource blocks (PRBs); and allocating such PRBs for communications that involve particular services; and enforcing admissions control and preemption.

Figure 2:
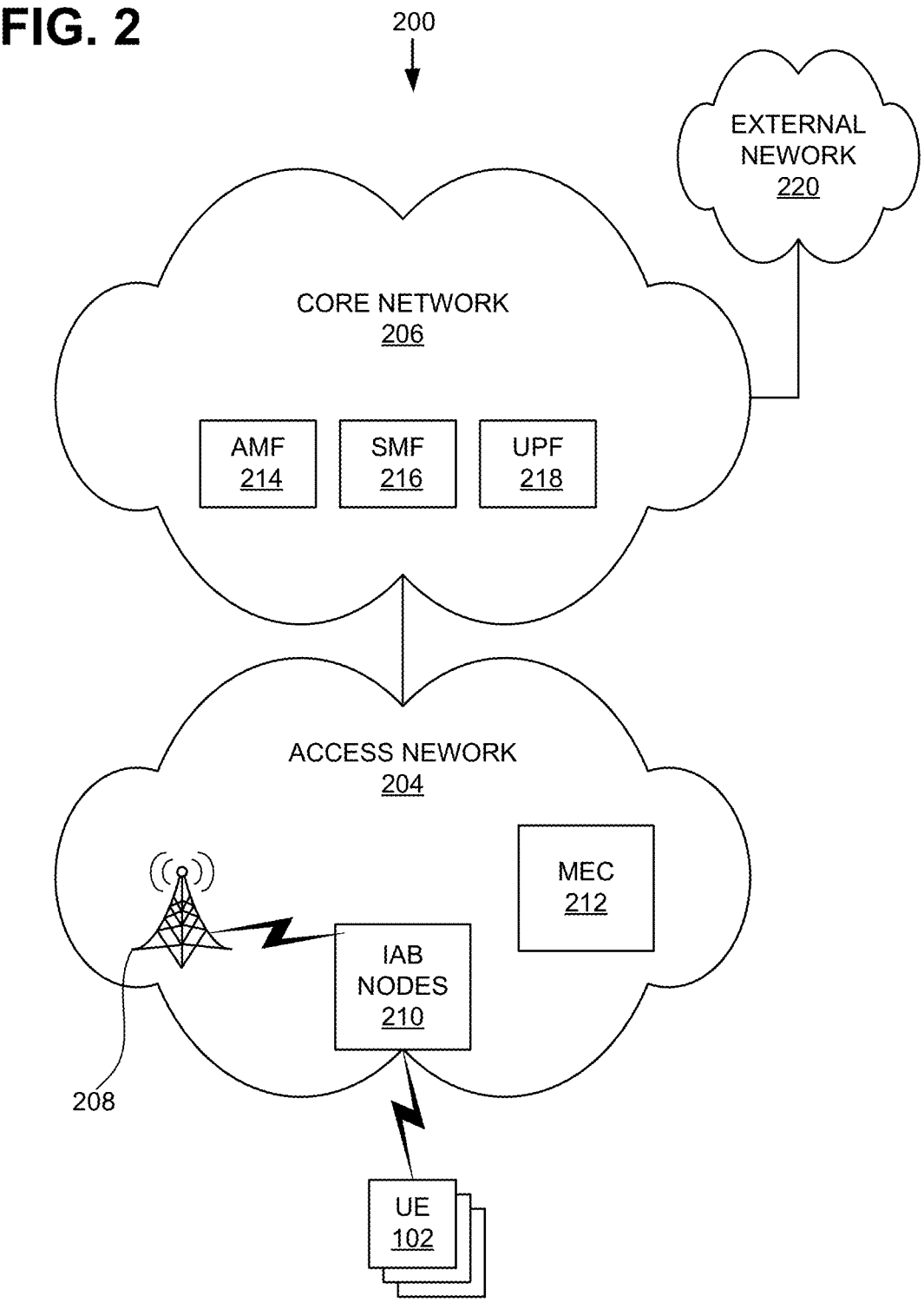
FIG. 2 illustrates an exemplary network environment in which the systems and methods described herein may be implemented.

FIG. 2 illustrates an exemplary network environment 200 in which the systems and methods described herein may be implemented. As shown, environment 200 may include UE 102 (also UEs 102), an access network 204, a core network 206, and an external network 220.

UE 102 may include a wireless communication device, a mobile terminal, or a FWA device. Examples of UE 102 include: a smart phone, a tablet device, a wearable computer device (e.g., a smart watch), a laptop computer, an autonomous vehicle with communication capabilities, a portable gaming system, and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

When UE 102 attaches to access network 204 for a service, UE 102 may send signals that include S-NSSAI. When access network 204 receives the S-NSSAI, access network 204 or network components therein may use the S-NSSAI to prioritize data to/from UE 102.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include a Long-Term Evolution (LTE) radio network, a Fifth Generation (5G) radio network and/or another advanced radio network. These radio networks may operate in many different frequency ranges, including millimeter wave (mmWave) frequencies, sub 6 GHz frequencies, and/or other frequencies. Access network 204 may include many wireless stations and components herein referred to as Integrated Access and Backhaul (IAB) nodes. In FIG. 2, these are depicted as a wireless station 208 and IAB nodes 210. Wireless station 208 and IAB nodes 210 may establish and maintain an over-the-air channel with UE 102 and backhaul channels with core network 206.

Wireless station 208 may include a Fourth Generation (4G), 5G, or another type of wireless station (e.g., evolved Node B (eNB), next generation Node B (gNB), etc.) that includes one or more Radio Frequency (RF) transceivers. In FIG. 2, wireless station 208 is depicted as receiving a backhaul wireless link from IAB nodes 210. A wireless station 208 that is attached to an TAB node via a backhaul link is herein referred to as IAB donor 208. As used herein, the term "IAB donor" refers to a specific type of TAB node. IAB donor 208 may have the capability to act as a router.

IAB nodes 210 may include one or more devices to relay signals from IAB donor 208 to UE 102 and from UE 102 to IAB donor 208. An TAB node 210 may have an access link with UE 102, and have a wireless and/or wireline backhaul link to other IAB nodes 210 and/or TAB donor 208. An TAB node 210 may have the capability to operate as a router, for exchanging routing information with IAB donor 208 and other IAB nodes 210 and for selecting traffic paths.

Both IAB donor 208 (wireless station 208) and IAB nodes 210 may have the capability to establish data priorities, such as those described above, based on the network slice on which the service is implemented. In the embodiments described herein, because different services are implemented on different network slices, wireless station 208 (or IAB donor 208) and IAB nodes 210 may be configured to use network slice identifiers (i.e., S-NSSAIs) that accompany data to distinguish data for different services and to prioritize data for processing. In particular, as described below, DU 408 within wireless station 208 and IAB nodes 210 use the priorities for: scheduling the data for transmission; determining when to allocate particular physical resources, herein referred to as physical resource blocks (PRBs) and allocating such PRBs for communications that involve particular services; and enforcing admissions control and preemption.

As further shown, access network 204 may include Multi-Access Edge Computing (MEC) clusters 212. MEC clusters 212 may be located geographically close to wireless stations, and therefore also be close to UEs 102 serviced by access network 204 via wireless stations. Due to its proximity to UEs 102, MEC cluster 212 may be capable of providing services to UEs 102 with minimal latency. Depending on the implementations, MEC clusters 212 may provide many core functions at network edges. In other implementations, MEC clusters 212 may be positioned at other locations (e.g., in core network 206) at which MEC clusters 212 can provide computational resources for improved performance.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of Internet Protocol (IP) services to UE 102, and may interface with other networks, such as external network 220.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components. In FIG. 2, core network 206 is illustrated as including AMF 214, SMF 216, and UPF 218, which are 5G core network components. Although core network 206 may include other 5G core network components, 4G core network components, or another type of core network components, they are not illustrated in FIG. 2 for simplicity.

AMF 214 may perform registration management, connection management, reachability management, mobility management, lawful intercepts, Short Message Service (SMS) transport for UE 102, management of messages between UE 102 and SMF 216, access authentication and authorization, and location services management. AMF 214 may provide the functionality to support non-3$^{rd}$ Generation Partnership Project (3GPP) access networks, and/or other types of processes.

SMF 216 may perform session establishment, session modification, and/or session release, perform Dynamic Host Configuration Protocol (DHCP) functions, perform selection and control of UPF 218, configure traffic steering at UPF 218 to guide the traffic to the correct destinations, terminate interfaces toward a Policy Control Function (PCF), perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data.

UPF 218 may maintain an anchor point for intra/inter-Radio Access Technology (RAT) mobility, maintain an external Protocol Data Unit (PDU) point of interconnect to a particular packet data network, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB), and/or perform other types of user plane processes. UPF 218 may act as a gateway in a network slice.

External network 220 may include networks that are external to core network 206. In some implementations, external network 220 may include packet data networks, such as an Internet Protocol (IP) network.

In FIG. 2, AMF, 214 and/or another network component may forward S-NSSAIs and data to wireless station 208 and/or IAB nodes 210. DU 408 (not shown) in wireless station 208 and IAB nodes 210 may use the S-NSSAIs to prioritize the data, for scheduling, for resource allocation, and for enforcing accessibility and preemption.

For simplicity, FIG. 2 does not show all components that may be included in network environment 200 (e.g., routers, bridges, wireless access point, additional networks, additional UEs 102, AMF 214, SMF 216, UPF 218, wireless station 208, IAB nodes 210, MEC clusters 212, etc.). Depending on the implementation, network environment 200 may include additional, fewer, different, or a different arrangement of components than those illustrated in FIG. 2. Furthermore, in different implementations, the configuration of network environment 200 may be different. For example, wireless station 208 may not be linked to IAB nodes 210, and may operate in frequency ranges (e.g., sub-6 GHz) different from or same as those used by IAB nodes 210 (e.g., mmWave or another frequency range).

Figure 3:
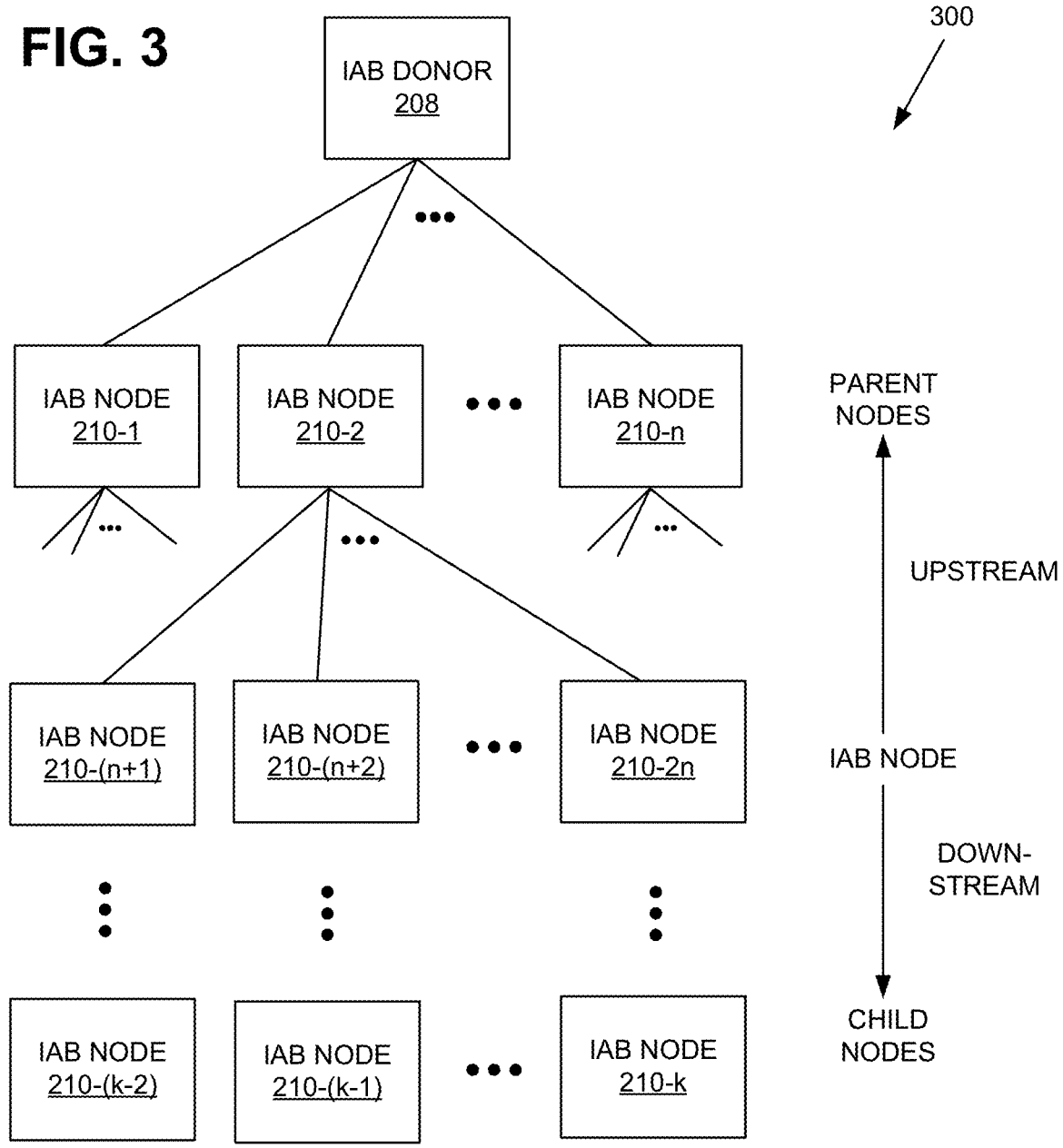
FIG. 3 illustrates an exemplary network layout of Integrated Access and Backhaul (IAB) nodes according to an implementation.

FIG. 3 illustrates an exemplary network layout of IAB nodes 210 according to one implementation. As shown, some IAB nodes 210 may be attached to IAB donor 208 and to other IAB nodes 210 through backhaul links. Each IAB node 210 may have a parent node upstream (e.g., either a parent IAB node 210 or IAB donor 208) and a child node downstream (e.g., either a UE 102 or a child IAB node 210). An IAB node 210 that has no child IAB node 210 is herein referred to as a leaf IAB node 210. UE 102 may establish an access link with any of IAB nodes 210 and not just the leaf IAB nodes 210.

Figure 4:
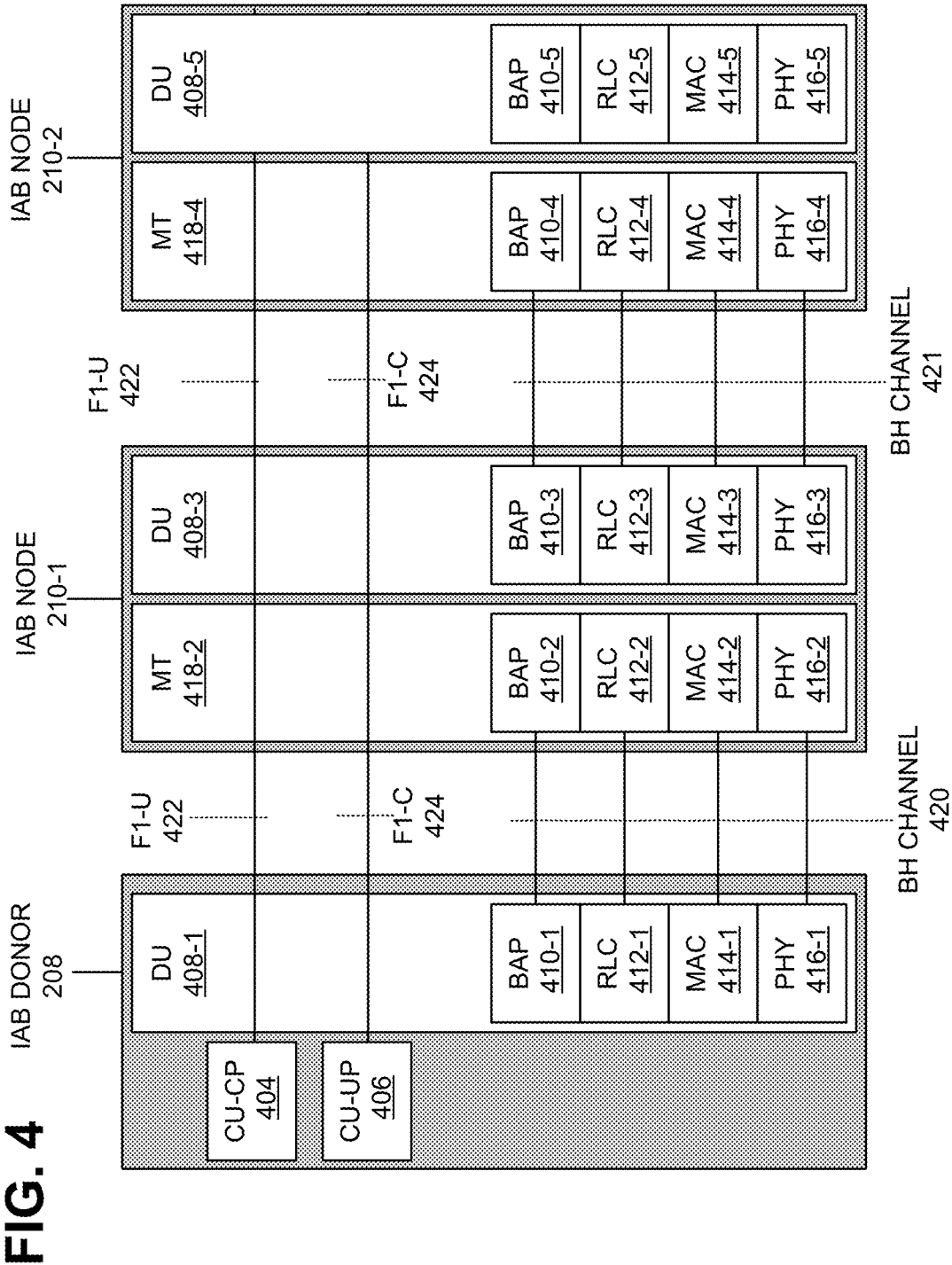
FIG. 4 illustrates exemplary functional components of IAB nodes and an IAB donor according to an implementation.

FIG. 4 illustrates exemplary functional components of IAB donor 208 and IAB nodes 210 in FIGS. 1-3. As indicated above, both IAB donor/wireless station 208 and IAB nodes 210 may have the capability to establish data priorities based on the network slice on which the service is implemented. IAB donor 208 and IAB nodes 210 may be configured to the priorities for scheduling, resource allocation, and enforcing admissions control and preemption. Exchange and use of S-NSSAIs among the subcomponents of IAB donor/wireless station 208, IAB nodes 210, and/or other network components is described below with reference to FIG. 7.

In FIG. 4, although only a single IAB node 210-1 is shown to be between IAB node 210-2 and IAB donor 208, in other embodiments, there may be many IAB nodes 210 between an IAB node 210-2 and IAB donor 208. Furthermore, although, FIG. 4 shows only a single path from the IAB node 210-2 to IAB donor 208, there may be one or more paths from each IAB node 210 to IAB donor 208.

As shown, IAB donor 208 may include a Central Unit-Control Plane (CU-CP) 404, a CU-User Plane (CU-UP) 406, and a DU 408-1. IAB node 210-1 may include a mobile terminal (MT) 418-2 and a DU 408-3, and IAB node 210-2 may include MT 418-4 and DU 408-5. MTs 418-2 and 418-4 have some of the capabilities of UE 102. Communication protocol stacks for DUs 408 and MTs 418 are shown for IAB donor 208, IAB node 210-1, and IAB node 210-2. Although IAB donor 208, IAB node 210-1, and IAB node 210-2 may include additional components, for simplicity, they are not illustrated in FIG. 4. In some implementations, CU-CP 404, CU-UP 406 and DU 408 may not be co-located, where wireless station 208 is not localized to a single geographical area. In other implementations, CU-CP 404, CU-UP 406, and DU 408-1 may be co-located, as part of wireless station 210. Furthermore, in some implementations, wireless station 208 may not be linked to IAB nodes 210 and may not operate as an IAB donor 208.

CU-CP 404 may perform control plane signaling associated with managing DUs 408 (e.g., DUs 408-1, DU 408-3, and DU 408-5) over F1-C interfaces 424. CU-CP 404 may signal to DUs 408 over a control plane communication protocol stack that includes, for example, F1AP (e.g., the signaling protocol for F1 interface between a CU and a DU). CU-CP 404 may include protocol layers comprising: Radio Resource Control (RRC) layer and a Packet Data Convergence Protocol-Control Plane (PDCP-C). DU 408-3 and DU 408-5 in IAB nodes 210-1 and 210-2 may include corresponding stacks to handle/respond to the signaling (not shown).

CU-UP 406 may perform user plane functions associated with managing DUs 408 (e.g., DU 408-1, 408-3, and 408-5) over F1-U interfaces 422. CU-UP 406 may interact with DUs 408 over a user plane communication protocol stack that includes, for example, General Packet Radio Service Tunneling Protocol (GTP)-User plane, the User Datagram Protocol (UDP), and the IP. DU 408-3 and DU 408-5 in IAB nodes 210-1 and 210-2 would have corresponding stacks to handle/respond to messages from CU-UP 406 (not shown). CP-UP 406 may include processing layers that comprise a Service Data Adaptation Protocol (SDAP) and a PDCP-User Plane (PDCP-U).

Although CU-CP 404 and CU-UP 406 (collectively referred to as CU) and DU 408-1 are part of wireless station 208, the CU does not need to be physically located near DU 408-1, and may be implemented as cloud computing elements, through network function virtualization (NFV) capabilities of the cloud. The CU may communicate with the components of core network 206 through S1/NG interfaces and with other CUs through X2/Xn interfaces.

DUs 408 may provide support for one or more cells covered by radio beams at the antennas of IAB donor 208 and/or IAB nodes 210. DUs 408 may handle UE mobility, from a DU to a DU, gNB to gNB, cell to cell, beam to beam, etc. As noted above, DUs 408 communicate with a CU through an F1 interface (e.g., F1-U 422 and F1-C 424). In FIG. 4, the control plane connections from CU-CP 404 and CU-UP 406 are shown as terminating at the DU 408-5 in IAB node 210-2. However, for the path between IAB donor 208 and IAB node 210-1, CU-CP 404 and CU-UP 406 would terminate their connections at the DU 408-3 in IAB node 210-1, although not shown in FIG. 4.

Each of MTs 418-2 and 418-4 permits its host device to act like a mobile terminal (e.g., UE 102). For example, to DU 408-1 in IAB donor 208, MT 418-2 in IAB node 210-1 behaves similarly as a mobile terminal attached to DU 408-1. The relationship between MT 418-2 and DU 408-1, and between MT 418-4 and DU 408-3, is established over a Backhaul (BH) channel 420 between DU 408-1 of IAB donor 208 and MT 418-2 of IAB node 210-1 and BH channel 421 between DU 408-3 of IAB node 210-1 and MT 418-4 of IAB node 210-2.

Each of BH channels 420 and 421 in FIG. 4 includes multiple network layers that include, for example, a Backhaul Adaptation Layer (BAP) 410 (BAP 410-1 through BAP 410-4), a Radio Link Control (RLC) 412 (RLC 412-1 through RLC 412-4), a Media Access Control (MAC) 414 (MAC 414-1 through MAC 414-4), and a Physical layer (PHY) 416 (PHY 416-1 through PHY 416-4). BAP 410 packages data and sends them from one IAB node 210 (e.g., IAB node 210-2) to IAB donor 208. RLC 412 receives upper layer protocol data units (PDUs), groups them for different transport channels, and transfers them to peer RLC 412 over lower layers. MAC 414 maps the RLC 412 to physical layer data/signals.

MAC 414 multiplexes and de-multiplexes logical channels, prioritizes the channels, handles hybrid automatic repeat request, and deals with random access control. In addition, MAC 414 manages the data as MAC PDUs, and schedules them for transmission over PHY 416. The result of scheduling has the effect of pre-committing, at PHY 416, blocks of frequency ranges and time intervals to be used for transmission of particular signals/data. These blocks of frequency-ranges and time intervals are herein referred to as physical resource bocks (PRBs). That is, scheduling reserves specific PRBs for particular transmissions at specified times. PRBs are components of what is referred to as radio frames, as described below with reference to FIG. 5A to FIG. 6.

Figure 5A:
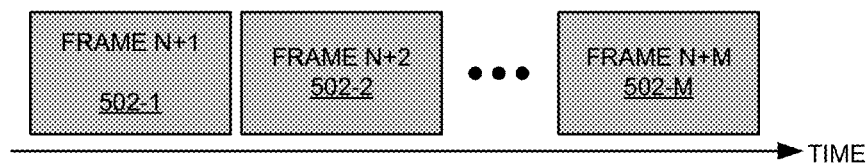
FIG. 5A illustrates exemplary radio frames at the physical layer of a communication protocol stack.

FIG. 5A illustrates exemplary radio frames 502-1 through 502-M that are transmitted from/to PHY 416 in DU 408 to/from PHY 416 in MT 418 over the physical channel (e.g., between IAB node 210-2 and IAB node 210-1, between IAB node 210-1 and IAB donor 208, or between UE 102 and an IAB node 210). When data or signal from DU 408 is sent over a physical channel, they are arranged in blocks, or otherwise known as radio frames 502. Each of frames 502 occupies a particular frequency band and spans a particular time interval, which may depend on the particular Radio Access Technology (RAT) used.

Figure 5B:
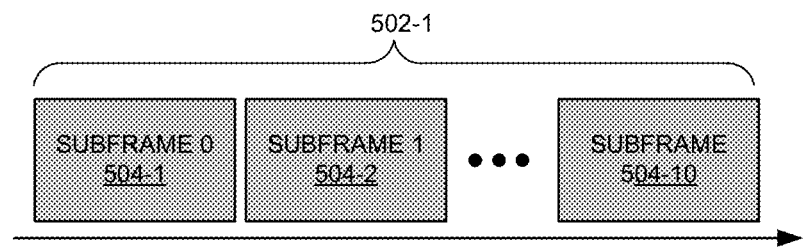
FIG. 5B illustrates exemplary sub-frames of a radio frame.
Figure 5C:
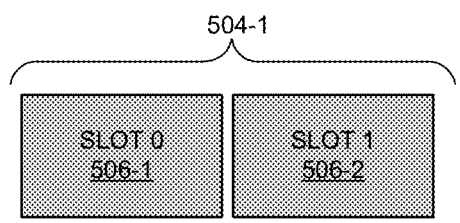
FIG. 5C illustrates exemplary components of a sub-frame within a radio frame.

FIG. 5B illustrates exemplary sub-frames of a radio frame 502-1 of FIG. 5A. As shown, each frame 502-1 is partitioned into ten sub-frames 504-1 to 504-10. FIG. 5C illustrates exemplary components of a sub-frame 504-1 of FIG. 5B. As shown, a sub-frame 504-1 includes two slots 506-1 and 506-2.

Figure 5D:
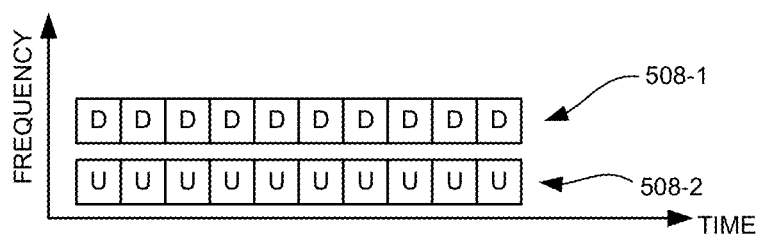
FIG. 5D illustrates exemplary sub-frames in a Frequency Division Duplex (FDD) uplink and downlink channels.
Figure 5E:
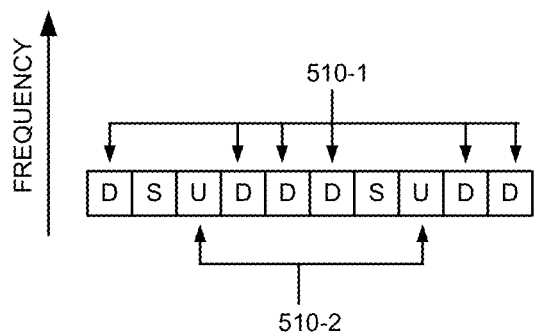
FIG. 5E illustrates exemplary sub-frames in a Time Division Duplex (TDD) uplink and downlink channels.

In FIG. 5A, in an uplink, frames 502 may be transmitted from MT 418 to DU 408, and in a downlink, the frames 502 may be transmitted from DU 408 to MT 418. Depending on the implementation, frames 502 in an uplink and a downlink may occupy different frequency bands or the same frequency band. For example, in the frequency division duplex mode (FDD), the uplink frames and downlink frames may occupy different frequency bands. FIG. 5D illustrates exemplary sub-frames of an FDD uplink and downlink channels. As illustrated, uplink sub-frames 508-2 (marked with letter "U") and downlink sub-frames 508-1 (marked with letter "D") occupy different frequency bands. In another example, FIG. 5E illustrates sub-frames of Time Division Duplex (TDD) uplink and downlink channels. Uplink sub-frames 510-2 (marked with "U") and downlink sub-frames 510-1 (marked with "D") occupy the same frequency band. The sub-frames marked with the letter "S" are known as special frames, and are inserted at the transition between a downlink and an uplink sub-frames.

Figure 6:
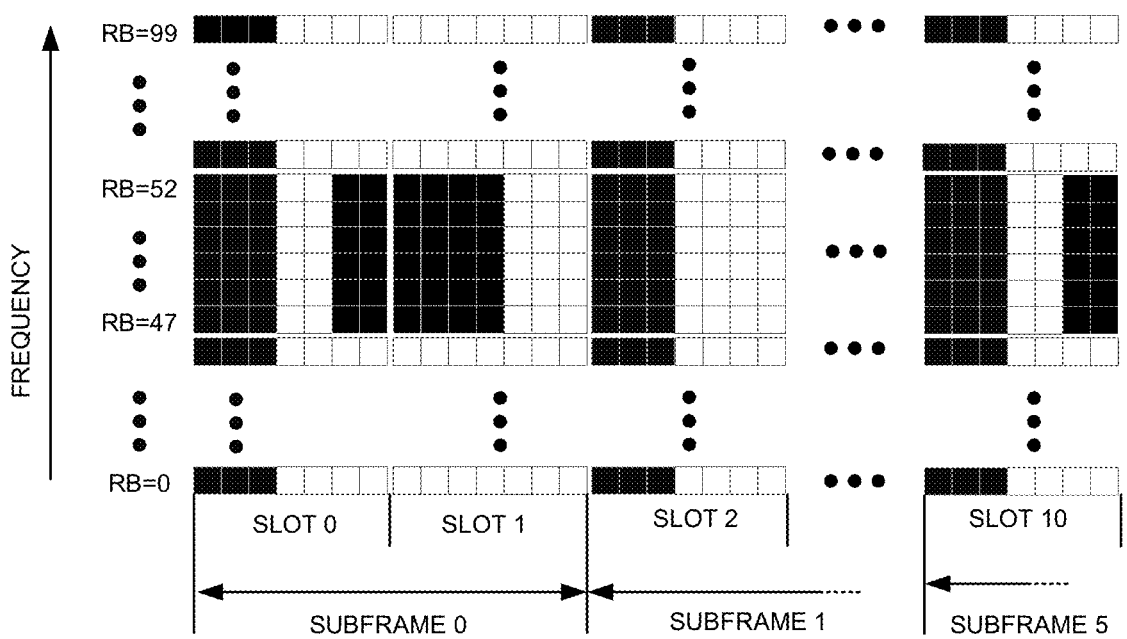
FIG. 6 illustrates physical resource blocks in radio frames.

FIG. 6 illustrates an exemplary structure of a radio frame 502 of FDD downlink in greater detail. In FIG. 6, each square represents a physical resource block (PRB), which is the smallest unit of frequency and time interval that DU 408 or MT 418 may allocate (e.g., schedule) for transmission.

Each PRB may span a number of subcarriers (e.g., 12) in frequency and a number of Orthogonal Frequency Division Multiplex (OFDM) symbol durations in time. The spacing of the subcarriers and the symbol duration may depend on the specific RAT and its mode. For example, for 5G NR, the subcarrier spacing may be about 15, 30, 120, or 240 kHz, and the symbol duration may be about 66.67, 33.33, 8.33, 4.17 microseconds (excluding cyclic prefixes).

In FIG. 6, PRBs extend from RB=0 to RB=99 in frequency (equivalently 20 MHz) and slightly over half a frame (i.e., slightly over 10 sub-frames) in time. In the example shown, each PRB is one OFDM symbol long (although in other embodiments, a PRB may include additional symbols), each sub-frame includes 14 symbols, and each slot includes 7 OFDM symbols, assuming the standard cyclic prefix (CP). The black squares in FIG. 6 are PRBs that may carry specific signals from DU 408 to MT 418. Frequency-time structures of PRBs for a FDD uplink is not shown.

As indicated above, DU 408 sets data priorities based on S-NSSAIs. In addition, DU 408 uses the priorities for: scheduling data for transmission; determining when to allocate particular PRBs and to allocate such PRBs for communications that involve particular services; and enforcing admissions control and preemption. For DU 408 to perform these functions, many network components exchange signals with DU 408 and/or send/receive data to/from DU 408.

Figure 7:
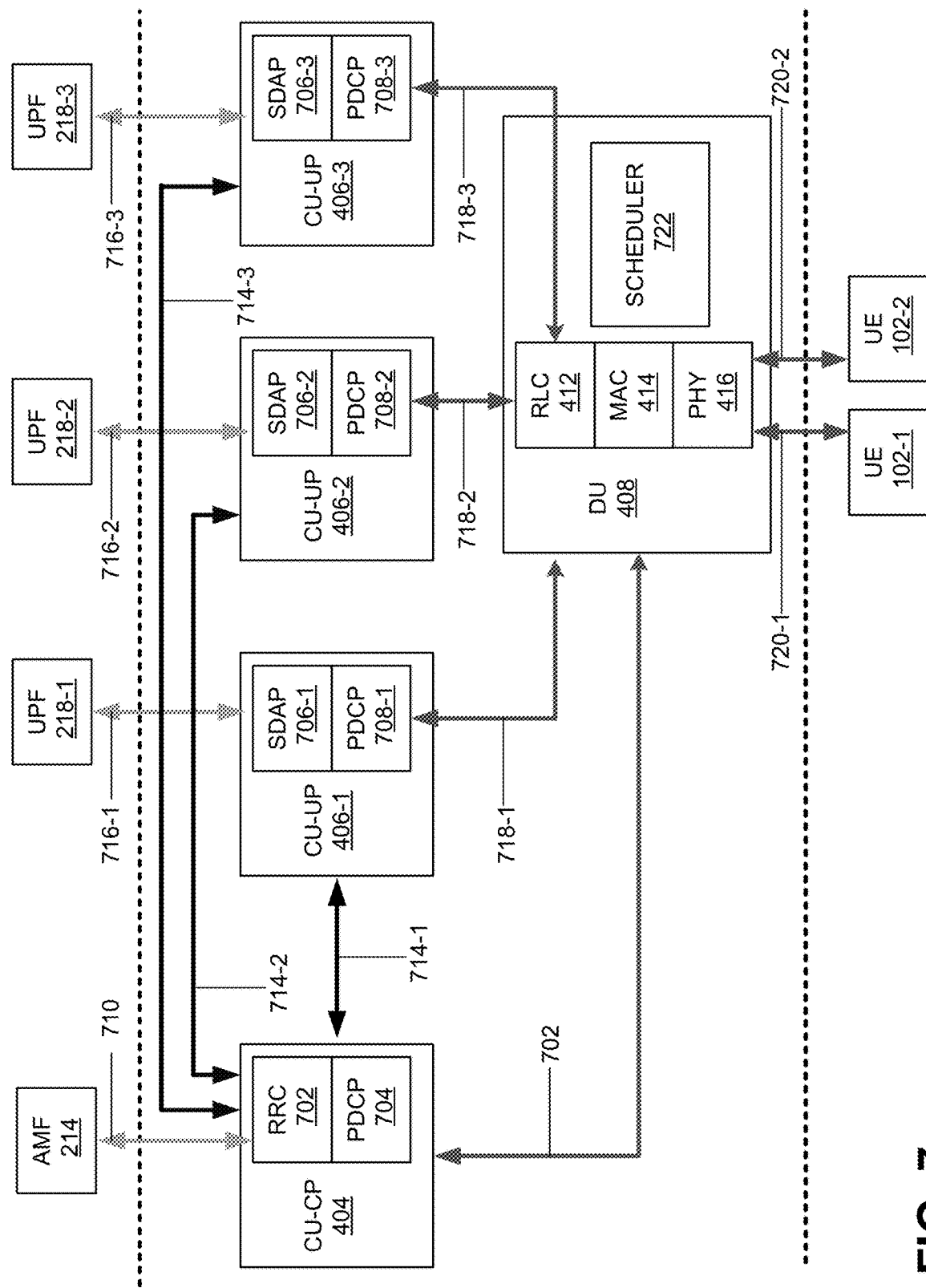
FIG. 7 illustrates exemplary exchange of information between Distributed Unit (DU) network components for handling data based on Single-Network Slice Assistance Information (S-NSSAIs)

FIG. 7 illustrates exemplary exchange of information between DU 408 and network components for handling data based on S-NSSAIs. In FIG. 7, information exchange related to handling data based on S-NSSAIs occurs between CU-CP 404, CU-UP 406 (CU-UPs 406-1, 406-2, and 406-3), AMF 214, UPF 218 (UPFs 218-1, 218-2, and 218-3), DU 408, and UE 102 (UEs 102-1 and 102-2). AMF 214 is included in core network 206 (FIG. 2); each of UPFs 218-1, 218-2, and 218-3 is included in a different network slice and may act as a gateway for the corresponding network slice; CU-CP 404 and CU-UPs 406 may be in a cloud, access network 204, or wireless station 208. DU 408 may be included in wireless station 208 (or IAB donor 208) or IAB nodes 210. Although, other intermediate DUs 408 and MTs 418 may exist between the DU 408 shown and CU-Ups 406, they are not illustrated in FIG. 7 for simplicity. CU-CP 404, CU-UPs 406, and DU 408 are part of access network 206.

In FIG. 7, CU-CP 404 forwards a DU setup/configuration message over path 702 (F1-C interface) to DU 408. The setup/configuration message may include, for example, a list of allowable S-NSSAIs and/or other information associated with S-NSSAIs. Assume that UE 102 then wishes to establish a session with a service/application on a network slice. Based on the routing information UE 102 has, UE 102 maps a to-be-requested service session to a particular network slice and therefore, to the S-NSSAI for the network slice. UE 102 then makes the request for the session over the Data Radio Bearer (DRB). In FIG. 7, for example, UE 102-1 make its session requests over DRB #1 and #2 (path 720-1); and UE 102-2 makes its session request through DRB #3 (720-2).

When DU 408 receives a request for session from UE 102-1 and/or 102-2, DU 408 may send a UE context message to CU-CP 404 over path 702. A context message may include a DRB identifier (DRB ID or DRB #), an S-NSSAI (provided by the UE 102 in its session request), and a QoS Flow level parameter. When CU-CP 404 receives the UE context and/or other information from a CU-UP 406, CU-CP 404 may send a session request message to AMF 214. AMF 214 may perform various tasks in response and then return a PDU session ID (710) to CU-CP 404.

CU-CP 404 may then issue a bearer context message to a CU-UP 406 (one or more of CU-UPs 406-1, 406-2, and 406-3), to handle the PDU session. In FIG. 7, CU-CP 404 is shown as sending such a bearer context message over a path 714 (one of paths 714-1, 714-2, and 714-3) to CU-UP 406 (one of CU-UP 406-1, CU-UP 406-2, and CU-UP 406-3). Each of paths 714-1, 714-2, and 714-3 each represents an E1 interface between CU-CP 404 and CU-UP 406. A bearer context message may include an S-NSSAI (associated with the application or the service), DRB IDs for the session, and SDAP information. The SDAP information may map a DRB ID to a QoS Flow Identifier (QFI) that identifies a particular QoS Flow from the UPF 218 associated with the network slice having the S-NSSAI. Each of CU-UPs 406-1, 406-2, and 406-3, after the receipt of a corresponding bearer setup message from CU-CP 404, may be configured to direct data from/to a DRB identified by the DRB # (in the bearer setup message) to/from a QoS Flow, designated by the QFI. In FIG. 7, CU-UP 406-1 is shown as directing DRB data 718-1 (at DU 408) to/from the session 716-1 with a corresponding QFI; CU-UP 406-2 is shown directing DRB data 718-2 (at DU 408) to/from the session 716-2 with a corresponding QFI; and CU-UP 406-3 is shown as directing DRB data 718-3 (at DU 408) to/from the session 716-3 with a corresponding QFI. Each of DRB data 718 is conveyed between DU 408 and a CU-UP 406 over a F1-U interface, and from a CU-UP 406 to the corresponding session 716 over the N3 interface. Each of the sessions 716-1, 716-2, and 716-3 is with the corresponding UPF 218-1, 218-2, and 218-3 at the corresponding network slice, identified by the S-NSSAI for the session.

With the CU-UP 406 and DU 408 set up for the session, DU 408 may determine the priority of the session, and then use the priority for scheduling uplink/downlink data, assign high-priority PRBs for conveying data between DU 408 and UE 102, and/or for enforcing accessibility and preemption policies. The priority is assigned based on the S-NSSAI associated with the session.

For downlinks, with respect to scheduling, when DU 408 receives data from session 718-1, 718-2, and/or 718-3, a scheduler 722 in DU 408 may arrange the data from sessions 718-1, 718-2, and 718-3 in the order of their priorities. If one set of data from session 718-1 and another set of data from session 718-2 are to be transmitted, scheduler 722 may schedule the data from the session with higher priority to be transmitted before the other session. With respect to PRB allocation, when data with a priority that is higher than the priority associated with particular PRBs, scheduler 722 may allocate/dedicate the PRBs for the transmission of the data (i.e., schedule the data such that the high-priority PRBs are used for the transmission). With respect to preemption, when data with a sufficiently high priority is in a scheduling contention for the same PRBs as another data with a lower priority for transmission, scheduler 722 may overwrite the lower priority data with the higher priority data, in the buffer for transmission. That is, data with the higher priority preempts lower priority data. The preempted data is then scheduled to be transmitted using different PRBs.

For uplinks, when DU 408 receives a scheduling request from UE 102, a scheduling grant may be provided to UEs 102 in response to the scheduling request, such that the session with higher priorities are favored (e.g., a schedule for uplink transmission is granted to one UE 102 to send data to DU 408, over a different schedule for another UE 102 when they are in potential scheduling conflict). In some situations, uplink data with high priorities may be allowed to be transmitted from UE 102 to DU 408 using high-priority PRBs. When DU 408 encounters requests for session/access whose priority is low, DU 408 may enforce policies pertaining to accessibility: UE 102 with low priority service requests are simply denied access to DU 408, at least for a time window. Depending on the implementation, a component other than scheduler 722 may enforce such a policy at DU 408.

In FIG. 7, when DU 408 is about to determine a priority associated with a session based on the S-NSSAI, DU 408 may inspect the values of the constituent fields of the S-NSSAI. FIG. 8A illustrates an exemplary format of an S-NSSAI, with its constituent fields. As shown, S-NSSAI 802 includes a Slice Service Type (SST) field 804 and a Slice Differentiator (SD) field 806. SST field 804 indicates a type of service; and the SD field 806 provides a value for uniquely distinguishing one network slice from other network slices.

FIG. 8B illustrates examples of SST 804 values according to one implementation. More specifically, FIG. 8B shows SST values for different types of services: 1 for enhanced Mobile Broadband (eMBB) service; 2 for Ultra Low Latency Communication (URLLC) service; 3 for a Massive IoT (MIoT) service; and 4 for a Vehicle to Everything (V2X) service.

FIG. 8C depicts exemplary fields of a SD 806 according to one implementation. In this implementation, SD 806 includes a NEST field 808 which includes 4 bits; a SERVICE field 810, which includes 8 bits; a CUSTOMER field 812, which includes 8 bits, and an Inter-Slice Priority Level (ISPL) field 814, which includes 4 bits. NEST field 808 values may be associated with a type of network slice—which may be related to the SST. SERVICE field 810 values may indicate the service that the network slice identified by the S-NSSAI supports. CUSTOMER field 812 values may identify either the type of customer or a particular customer; and ISPL field 814 values may indicate the relative priority of the network slice identified by the S-NSSAI. Depending on the implementation, DU 408 may prioritize data entirely based on the ISPL field 814 value of the SD, or alternatively, inspect and use NEST, SERVICE, and CUSTOMER field 808-812 values as well as the ISPL field 814 value.

FIG. 9 illustrates examples of SST, SD, and S-NSSAI according to one implementation. In particular, FIG. 9 illustrates S-NSSAIs for an eMBB— mobile service and an eMBB— fixed service (for a FWA). SSTs for both services are 0x01. NEST, SERVICE, and CUSTOMER of the SD for both services are 0. However, the ISPL for the services are 0x7 and 0x6. Accordingly, S-NSSAIs for the services are 0x01000007 and 0x01000006. Each of the S-NSSAIs is associated with a different set of data networks, identified by Data Network Names (DNNs) as illustrated.

FIG. 10 illustrates an exemplary mapping between S-NSSAIs and network services. For example, for an emergency service, the NEST field 808 value is 1, SERVICE field 810 value is 1, CUSTOMER field 812 value is 0, and the ISPL field 814 field value is 1, indicating a high priority. S-NSSAI has SST of 1 and SD of 1.1.0.1, where each of the subfields of the SD is separated by a period. The S-NSSAI for the emergency service is associated with the DNN of "emergency" and its 5G Quality-of-Service indicator (5QI) is 1. Values are shown for other services, such as a general Internet services, an administration service, a B2B internet service, a MIoT service, a URLLC service, etc. Depending on the implementation, a network component (e.g., DU 408, CU-CP 404, a PCF, AMF 214, SMF 216, UPF 218, etc.) may use a mapping similar to the one shown in FIG. 10 for determining the priorities for different S-NSSAIs.

Figure 11:
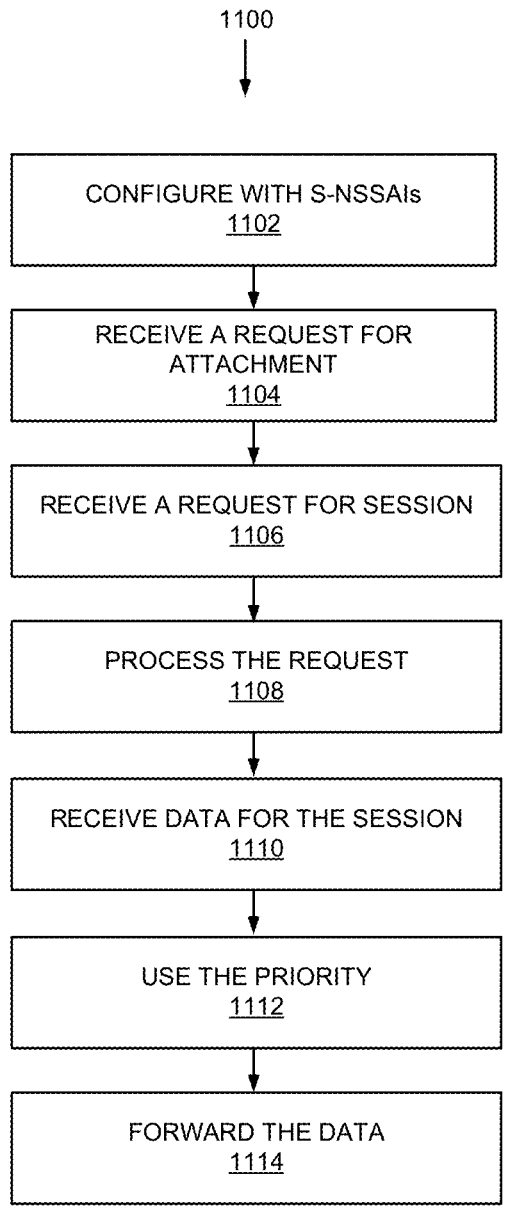
FIG. 11 is a flow diagram of an exemplary process that is associated with determining a priority associated with an S-NSSAI and using the priority.

FIG. 11 is a flow diagram of an exemplary process 1100 that is associated with determining the priority of an S-NSSAI and using the priority. In one implementation, process 1100 or portions of process 1100 may be performed by CU-CP 404, CU-UP 406, DU 408, AMF 214, UPF 218, SMF 216, a PCF, and UE 102. In other implementations, other network components may perform process 1100 and/or portions of process 1100.

As shown, process 1100 may include wireless station/IAB donor 208, IAB nodes 210, and/or DU 408 being configured based on NSSAI or S-NSSAIs (block 1102). For example, as discussed with reference to FIG. 7, CU-CP 404 may obtain a list of S-NSSAIs from another network component (e.g., AMF 214, a Network Slice Selection Function (NSSF), etc.). CU-CP 404 may then forward a list of S-NSSAIs for sessions that DU 408 may allow to be established by UE 102, to DU 408. DU 408 may store the list of S-NSSAIs.

Process 1100 may further include receiving a request for attachment from a UE 102 (block 1104). For example, UE 102 may send a request to attach to DU 408, which may result in a radio link between the UE 102 and DU 408. During the attachment, UE 102 may select one or more DRBs.

After the radio link is established and DRBs designated, DU 404 may receive a request to establish a session from the UE 102 (block 1106). Based on the routing information UE 102 has, UE 102 maps a to-be-requested service session to a particular network slice and therefore, to the S-NSSAI. UE 102 then makes the request for session over the DRB.

Process 1100 may further include processing the session request (block 1108). For example, when DU 408 receives a request for session from UE 102 in FIG. 7, DU 408 sends a UE context message to CU-CP 404 over path 702. The context message includes a DRB identifier (DRB ID or DRB #), an S-NSSAI (provided by the UE 102 in its session request), and a Quality-of-Service (QoS) Flow level parameter. When CU-CP 404 receives the UE context and/or other information from DU 408, CU-CP 404 sends a session request message to AMF 214, which may interact with other network core components (e.g., SMF 216, UPF 218, etc.) to set up the other endpoint for the session and return the session ID to CU-CP 404. CU-CP 404 may then issue a bearer context message to a CU-UP 406, for CU-UP 406 to handle the PDU session. A bearer context message may include an S-NSSAI (associated with the application or the service), DRB IDs for the session, and SDAP information. The SDAP information may map a DRB ID to a QoS Flow Identifier (QFI) that identifies a particular QoS Flow. CU-UP 406, after the receipt of a corresponding bearer setup message from CU-CP 404, may be configured to direct data from/to a DRB identified by the DRB # (in the bearer setup message) to/from a QoS Flow, designated by the QFI. The QFI is associated with the session (and/or the flow from the other endpoint of the session). Consequently, CU-UP 406 may receive session data and direct the received data to/from DU 408, over the FI-U interface. DRB data 718 is conveyed between DU 408 and a CU-UP 406 over a F1-U interface, and between a CU-UP 406 and UPF 218 (corresponding to the network slice identified by the S-NSSAI).

DU 408 may receive data (block 1110), from UPF 218 (corresponding to the S-NSSAI) through CU-UP 406 for the downlinks or from UE 102 for the uplinks. When DU 408 receives data for the session via CU-UP 406 for downlinks or from UE 102 for uplinks, DU 408 assigns a priority to the data based on the corresponding S-NSSAI (block 1112).

To assign the priority, DU 408 may use various parts of the S-NSSAI (e.g., SST, SD, NEST, SERVICE, CUSTOMER, and/or ISPL) and a related QoS value (e.g., 5QI) associated with the UE 102 to first determine the priority. DU 408 may use the determined priority for scheduling, for allocating particular PRBs for transmissions, and for enforcing accessibility and/or preemption policies (block 1112), for uplinks and downlinks.

For downlinks, with respect to scheduling, DU 408 may order data from the UPF 218 for transmission in accordance with the priority. If one set of data from one session and another set of data from another session are to be transmitted about the same time and frequencies, DU 408 may order the data from the session with a higher priority to be transmitted before the other data. With respect to PRB allocation, if a set of data has a priority that is higher than the priority associated with a set of common PRBs, DU 408 may assign the PRBs for the transmission of the data (i.e., schedule the data such that the PRBs are used for the transmission). With respect to preemption, when one set of data with a sufficiently high priority is in contention for the same PRBs as another set pf data for transmission, the set of data with the higher priority may overwrite the data with the lower priority in the DU transmission buffer. That is, data with the higher priority preempts the other data. The preempted data may be scheduled to be transmitted using different PRBs.

For uplinks, when DU 408 receives a scheduling request from UE 102, scheduling grants may be provided to UEs 102 via DU 408 or other network components, such that the session with higher priorities are favored (e.g., one schedule is granted to the UE 102 requesting a session with the higher priority over a potentially conflicting schedule to another UE 102). In certain situations, data with high priorities may be allowed to be transmitted from UE 102 to DU 408 using PRBs associated with high priorities. When DU 408 encounters requests for session/access whose priority is low, DU 408 may enforce policies pertaining to accessibility: UE 102 with low priority service requests are simply denied access. Depending on the implementation, a component other than scheduler 722 may enforce such a policy at DU 408.

Figure 12:
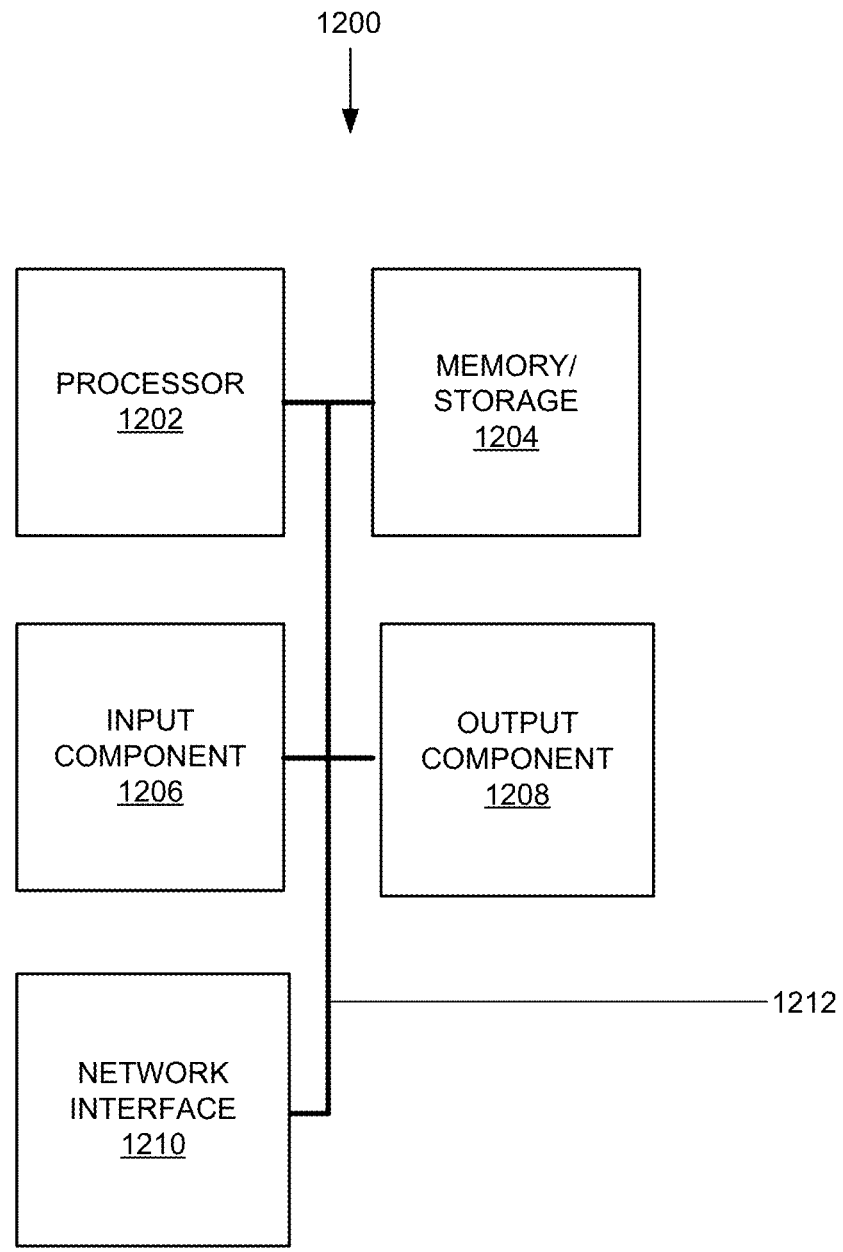
FIG. 12 depicts exemplary components of an exemplary network device, according to an implementation.

FIG. 12 depicts exemplary components of an exemplary network device 1200. Network device 1200 corresponds to or is included in UE 102, IAB nodes 210, and any of the network components of FIGS. 1-4 and 7 (e.g., a router, a network switch, servers, gateways, wireless stations 208, MEC cluster 212, CU-CP 404, CU-UP 406m DU 408, CU, etc.). As shown, network device 1200 includes a processor 1202, memory/storage 1204, input component 1206, output component 1208, network interface 710, and communication path 712. In different implementations, network device 1200 may include additional, fewer, different, or a different arrangement of components than the ones illustrated in FIG. 7. For example, network device 1200 may include a display, network card, etc.

Processor 1202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1200 and/or executing programs/instructions.

Memory/storage 1204 may include static memory, such as read only memory (ROM), and/or dynamic memory, such as random access memory (RAM), or onboard cache, for storing data and machine-readable instructions (e.g., programs, scripts, etc.).

Memory/storage 1204 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1204 may be external to and/or removable from network device 1200. Memory/storage 1204 may include, for example, a Universal Serial Bus (USB) memory stick, a dongle, a hard disk, off-line storage, a Blu-Ray® disk (BD), etc. Memory/storage 1204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1206 and output component 1208 may provide input and output from/to a user to/from network device 1200. Input and output components 1206 and 1208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1200.

Network interface 1210 may include a transceiver (e.g., a transmitter and a receiver) for network device 1200 to communicate with other devices and/or systems. For example, via network interface 1210, network device 1200 may communicate with wireless station 208. Network interface 1210 may include an Ethernet interface to a LAN, and/or an interface/connection for connecting network device 1200 to other devices (e.g., a Bluetooth interface). For example, network interface 1210 may include a wireless modem for modulation and demodulation.

Communication path 1212 may enable components of network device 1200 to communicate with one another.

Network device 1200 may perform the operations described herein in response to processor 1202 executing software instructions stored in a non-transient computer-readable medium, such as memory/storage 1204. The software instructions may be read into memory/storage 1204 from another computer-readable medium or from another device via network interface 1210. The software instructions stored in memory or storage (e.g., memory/storage 1204, when executed by processor 1202, may cause processor 1202 to perform processes that are described herein. For example, UE 102, AMF 214, SMF 216, UPF 218, IAB donor 208, IAB nodes 210, and DU 408 may each include various programs for performing some of the above-described functions for reducing latency.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIG. 11, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device included in a network, comprising:
a communication interface; and
a processor configured to:
receive, via the communication interface, a request to establish a session between a first device and a network slice, from the first device over a wireless link, for a service, wherein the request includes a Single-Network Slice Selection Assistance Information (S-NSSAI) that is associated with the network slice;
determine a priority for the session between the first device and the network slice by using the S-NSSAI, wherein the priority indicates precedence for at least one of:
scheduling data of the session over data of another session for transmission; or
granting scheduling requests for the session over scheduling requests of another session; and
process, based on the determined priority, uplink data or downlink data of the session.

2. The network device of claim 1, wherein the network device includes one of:
a wireless station;
an Integrated Access and Backhaul (IAB) node;
an IAB donor; or
a Distributed Unit (DU).

3. The network device of claim 1, wherein when the processor processes the downlink data, the processor is configured to:
receive first data from a network component included in the network slice, which provides the service and is identified by the S-NSSAI; and
transmit the first data to the first device.

4. The network device of claim 3, wherein the processor is further configured to:
schedule the first data for transmission to the first device based on the determined priority.

5. The network device of claim 3, wherein the processor is further configured to:
schedule the first data for transmission to the first device by assigning physical resource blocks (PRBs) associated with a particular priority; or
overwrite second data, in a buffer for the network device, with the first data when the priority is higher than a priority of the second data, wherein the buffer includes data to be transmitted to devices wirelessly linked to the network device.

6. The network device of claim 1, wherein when the processor processes the uplink data, the processor is configured to:
receive a scheduling request from the first device; and
send a scheduling grant to the first device in response to the scheduling request, wherein the scheduling grant is generated based on the priority.

7. The network device of claim 6, wherein the processor is further configured to:
receive first data from the first device in accordance with the scheduling grant; and
forward the first data to a network component on the network slice, which is identified by the S-NSSAI.

8. The network device of claim 1, wherein the processor is further configured to:
receive a list of S-NSSAIs that are associated with services that devices are allowed to access from the network over wireless links to the network device.

9. A method comprising:
receiving a request to establish a session between a first device and a network slice, from the first device over a wireless link, for a service, wherein the request includes a Single-Network Slice Selection Assistance Information (S-NSSAI) that is associated with the network slice;
determining a priority for the session between the first device and the network slice by using the S-NSSAI, wherein the priority indicates precedence for at least one of:
scheduling data of the session over data of another session for transmission; or
granting scheduling requests for the session over scheduling requests of another session; and
processing, based on the determined priority, uplink data or downlink data of the session, wherein a network includes a network component that receives the request.

10. The method of claim 9, wherein the network component includes one of:
a wireless station;
an Integrated Access and Backhaul (IAB) node;
an IAB donor; or
a Distributed Unit (DU).

11. The method of claim 9, wherein processing the downlink data includes:
receiving first data from a second network component included in the network slice, which provides the service and is identified by the S-NSSAI; and
transmitting the first data to the first device.

12. The method of claim 11, further comprising:
scheduling the first data for transmission to the first device based on the determined priority.

13. The method of claim 11, further comprising:
scheduling the first data for transmission to the first device by assigning physical resource blocks (PRBs) associated with a particular priority; or
overwriting second data, in a buffer for the network component, with the first data when the priority is higher than a priority of the second data, wherein the buffer includes data to be transmitted to devices wirelessly linked to the network component.

14. The method of claim 9, wherein processing the uplink data includes:
receiving a scheduling request from the first device; and
sending a scheduling grant to the first device in response to the scheduling request, wherein the scheduling grant is generated based on the priority.

15. The method of claim 14, further comprising:
receiving first data from the first device in accordance with the scheduling grant; and
forwarding the first data to a second network component on the network slice, which is identified by the S-NSSAI.

16. The method of claim 9, further comprising:
receiving a list of S-NSSAIs that are associated with services that devices are allowed to access from the network over wireless links to the network component.

17. A non-transitory computer-readable medium comprising processor-executable instructions, when executed by a processor included in a network component, that cause the processor to:
receive a request to establish a session between a first device and a network slice, from the first device over a wireless link, for a service, wherein the request includes a Single-Network Slice Selection Assistance Information (S-NSSAI) that is associated with the network slice;
determine a priority for the session between the first device and the network slice by using the S-NSSAI, wherein the priority indicates precedence for at least one of:

scheduling data of the session over data of another session for transmission; or granting scheduling requests for the session over scheduling requests of another session; and process, based on the determined priority, uplink data or downlink data of the session, wherein a network includes the network component.

18. The non-transitory computer-readable medium of claim 17, wherein the network component includes one of:

a wireless station;

an Integrated Access and Backhaul (IAB) node;

an IAB donor; or a Distributed Unit (DU).

19. The non-transitory computer-readable medium of claim 17, wherein when the processor processes the downlink data, the processor is configured to:

receive first data from a second network component included in the network slice, which provides the service and is identified by the S-NSSAI; and transmit the first data to the first device.

20. The non-transitory computer-readable medium of claim 19, wherein when executed by the processor, the processor-executable instructions further cause the processor to:

schedule the first data for transmission to the first device based on the determined priority.

\* \* \* \* \*